May 17, 1960 T. G. APICELLI 2,936,662
SHAFT COUPLING WITH TORQUE LIMITING MEANS
Filed April 29, 1958 2 Sheets-Sheet 2

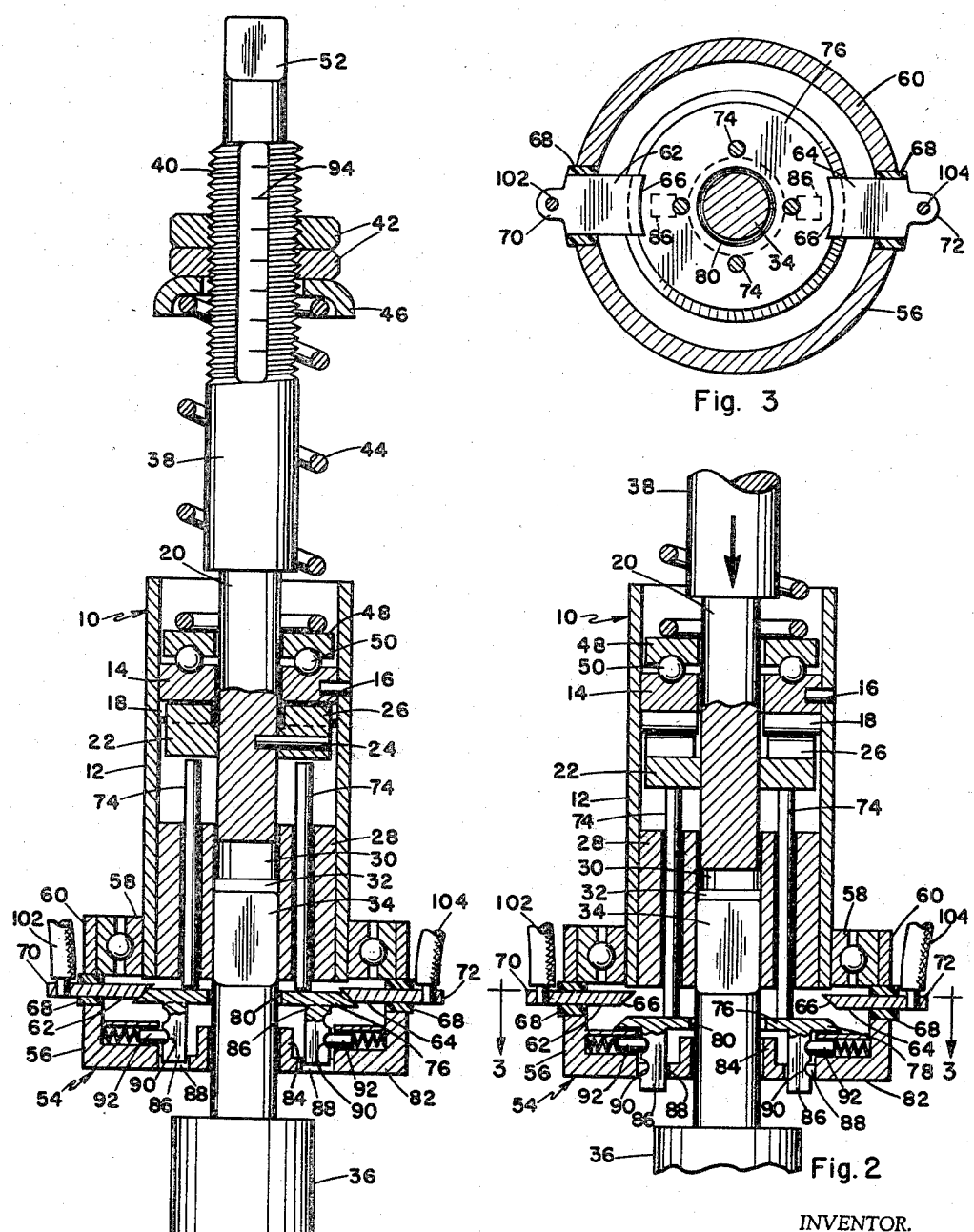

INVENTOR.
THOMAS G. APICELLI
BY
Knox & Knox

United States Patent Office 2,936,662
Patented May 17, 1960

2,936,662

SHAFT COUPLING WITH TORQUE LIMITING MEANS

Thomas G. Apicelli, Coronado, Calif.

Application April 29, 1958, Serial No. 731,798

4 Claims. (Cl. 81—52.4)

The present invention relates generally to torque shaft couplings and the like and more particularly to a torque shaft coupling having an automatic cut-off switch.

The primary object of this invention is to provide a torque shaft coupling for use where the torque must be strictly limited, the device being especially suited for power driven torque wrenches, the device including a fully automatic switch to cut off the power when the predetermined torque is reached.

Another object of this invention is to provide a torque shaft coupling which is easily adjustable over a wide range of torque settings within the limits of the particular installation or wrench used.

Still another object of this invention is to provide a torque shaft coupling in which the switch mechanism may be adapted to control electrical or fluid types of driving motors.

A further object of this invention is to provide a torque wrench which will accept conventional interchangeable wrenches, sockets and other attachments of various sizes.

Another object of this invention is to provide a torque shaft coupling which is adapted for fabrication from many different materials, so that the choice of material can be according to the dictates of availability and price considerations, the exact sizes and proportions being matters easily determined to suit particular conditions and needs.

Finally, it is an object to provide a torque shaft coupling of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1 is a longitudinal sectional view of a torque wrench showing my invention installed therein, the view being taken on the axis of the tool, certain parts being shown in full for clarity;

Figure 2 is a fragmentary sectional view similar to a portion of Figure 1, but showing the drive connection disengaged and the electrical switch in off position;

Figure 3 is a sectional view taken on the line 3—3 of Figure 2;

Similar characters of reference indicate similar or identical elements and portions throughout the specification and throughout the views of the drawings.

Figure 5:
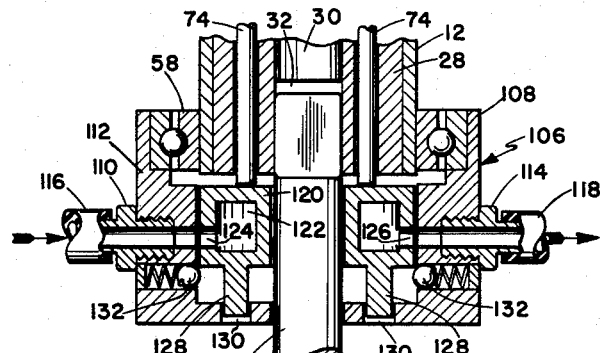
Figure 5 is a fragmentary sectional view similar to a portion of Figure 1, showing a fluid type cut-off switch or valve in place of the electrical switch.

Referring now to Figures 1–4 of the drawings, the torque shaft coupling is shown as applied to a torque wrench and includes a barrel assembly 10, comprising a cylindrical barrel 12 in which is fixed a driven clutch plate 14 secured adjacent the upper end of said barrel and locked in place by a pin 16, the lower face of said clutch plate having a plurality of radial teeth 18. Extending through the center of the clutch plate 14 and freely rotatable therein is a drive shaft 20, on which is mounted a drive clutch plate 22 fixed in place by a pin 24, said drive clutch plate having on its upper face a plurality of radial teeth 26 which are dimensioned to mesh with the teeth 18 on the driven clutch plate 14. Fixed inside the lower end of the barrel 12 is a plug 28 having a central bore 30 which serves as an end bearing for the end of the drive shaft 20, the lower portion 32 of said bore being non-circular in cross section to receive a driven element such as the shank 34 of a conventional socket tool 36, or the like.

The drive shaft 20 has an enlarged body 38, the upper portion of which is screw threaded, as indicated at 40, a pair of adjusting nuts 42 being screwed onto said threaded portion for torque adjustment. A compression type load spring 44 is fitted over the body 38, the upper end of said spring being seated in a dished retainer ring 46 beneath the nuts 42 and the lower end of said spring resting on a thrust plate 48 which is supported on the driven clutch plate 14 by a suitable thrust bearing 50. The upper end or shank 52 of the drive shaft 20 is shaped for engagement in conventional type chucks of driving motors.

At the lower end of the barrel 12 is a power cutoff means which, in the electrical version of this invention, may take the form of a switch assembly 54, comprising a short cylindrical housing 56 supported on said barrel by a ball bearing 58 or the like, so that the barrel may rotate within the housing. Fixed into the side wall 60 of the housing 56 are two opposed terminals 62 and 64, the inner ends of which are chamfered on the lower edges, as at 66, said terminals extending outwardly through insulating collars 68 and having connecting lugs 70 and 72 respectively, externally of said housing. Extending through the plug 28 parallel to the axis of the drive shaft 20 are a plurality of push rods 74, freely slidable in the plug. Within the housing 56 is a conductive contact disc 76 having a chamfered periphery 78 to fit upwardly against and between the chamfered edges 66 of terminals 62 and 64, said contact disc having a central opening 80 to clear the socket tool shank 34. The lower end wall 82 of the housing 56 has a central boss 84 through which the shank 34 is also a free rotating fit. Projecting downwardly from the lower face of the contact disc 76 are two guide bars 86 which are slidable through slots 88 in the end wall 82, said guide bars each having a similar pair of vertically spaced notches 90. Mounted in the housing 56 are two spring detents 92 which are biased inwardly to engage in the notches 90 to hold the contact disc 76 in either of two positions. In the upper position with the contact disc 76 engaging the terminals 62 and 64, the detents 92 are seated in the lower pair of notches 90, as in Figure 1, while in the lower position, the detents are seated in the other pair of notches 90 to hold the contact disc down, clear of said terminals, as in Figure 2. In normal driving position, the push rods 74 rest on the upper surface of the contact disc 76.

Figure 4:
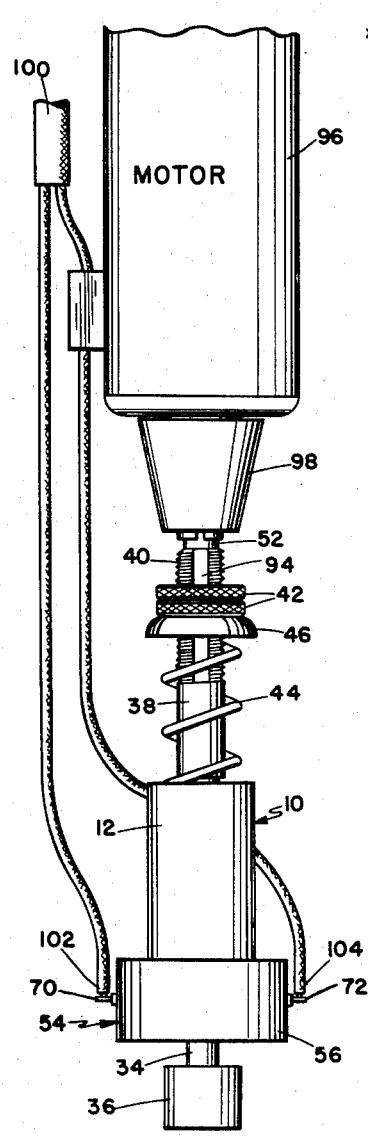
Figure 4 is a side elevation view of the invention on a reduced scale, showing an electrical drive motor and its connections to the tool.

The nuts 42 are adjusted to compress the load spring 44 to set the required torque value according to the particular nut, bolt, or the like, to be tightened. For convenience a suitable graduated torque scale 94 may be cut directly into the threaded portion 40, as shown in Figures 1 and 4. The tool is driven by an electric motor 96 having a conventional chuck 98 to hold the drive shaft shank 52, the power cable 100 to said motor being interrupted and the ends 102 and 104 thereof being connected to the connecting lugs 70 and 72. Thus the electrical circuit of the motor 96 passes between the terminals 62 and 64 across the contact disc 76. The drive shaft 20 and the entire barrel assembly 10 rotate as a unit to drive the socket tool 36, the switch assembly 54 remaining stationary. The switch assembly 54 may be hand held or otherwise secured against rotation, the required restraining force being negligible. When the nut or bolt being tightened is secured to the predetermined degree of tightness, the torque is sufficient to cause the teeth 26 on the drive clutch plate 24 to climb up on the teeth 18 of driven clutch plate 14, overcoming the load spring 44 and causing the drive shaft 20 to move axially downwardly. This causes the drive clutch plate 24 to press the push rods 74 down and force the contact disc 76 away from terminals 62 and 64, so breaking the circuit and stopping the motor 96, as in Figure 2. When the contact disc 76 is pushed down, the detents 92 enter the upper sockets 90 and retain the disc in its downward position with the guide bars 86 protruding below the housing 56 to indicate the off position of the switch. To restart the motor 96, the contact disc 76 must be returned to its connecting position between terminals 62 and 64 by manually pressing in the guide bars 86.

Figure 6:
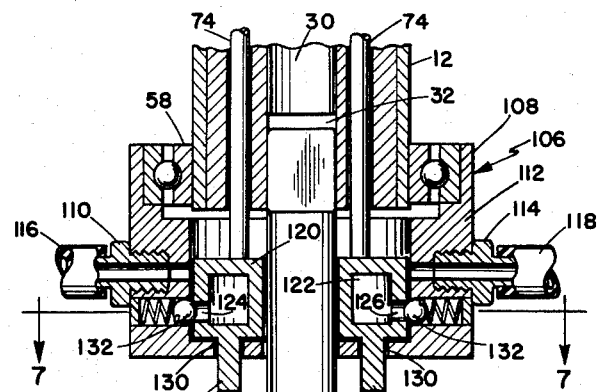
Figure 6 is a sectional view similar to Figure 5, but showing the fluid switch in off position.
Figure 7:
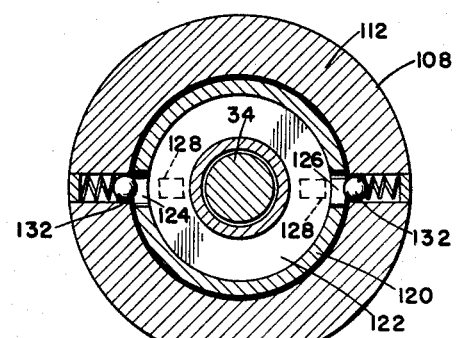
Figure 7 is a sectional view taken on the line 7—7 of Figure 6.

The torque wrench may also be used with fluid motors, such as conventional pneumatic or hydraulic motors, by substituting a different type of power cut-off means, such as a valve assembly 106, in place of the switch assembly 54. The valve assembly 106 comprises a cylindrical housing 108 mounted on the barrel 12 by the bearing 58, as previously described. The housing 108 has an inlet 110 in the side wall 112 and an outlet 114 directly opposite said inlet, the inlet and outlet having suitable connections for an inlet hose 116 and outlet hose 118 through which the motive fluid flows. Within the housing 108 is a fully enclosed, vertically slidable transfer ring 120 having an annular chamber 122, said chamber having opposed inlet and outlet ports 124 and 126 which are aligned with the inlet 110 and outlet 114, respectively, when the transfer ring is in its uppermost position in the housing, as in Figure 5. Extending downwardly from the lower surface of the transfer ring 120 are two guide bars 128 which project through slots 130 in the base of the housing 108. Mounted within the housing 108 are opposed spring detents 132 which engage beneath the lower edge of the transfer ring 120 in its upper position. When the predetermined torque is reached, the push rods 74 force the transfer ring 120 downwardly, as in Figure 6, to close the inlet 110 and outlet 114 and cut off the fluid flow, so stopping the fluid motor. When the transfer ring 120 is in its lower position, the detents 132 snap into the inlet and outlet ports 124 and 126 to hold the transfer ring in place until reset by pushing in the guide bars 128 which protrude below the housing 108 to indicate the off position. The guide bars 86 and 128, therefore, constitute visual indicating means to advise the operator when the power is cut off. It is also important to note that this visual indicating means is located immediately adjacent to the driven element illustrated as the socket tool 36.

It will be evident that the cut-off action is similar for both electrical and fluid motive power. Push rods 74, actuated by axial motion of the drive shaft 20 in overcoming a load spring 44 at a predetermined torque setting, push a switch element from a conductive to a non-conductive position, and detents hold the switch element in non-conductive position until manually reset by retracting the visible indicating elements which constitute guiding means for the switch element.

Obviously this shaft coupling is not limited to use with the torque wrench herein illustrated. Furthermore, when the invention is embodied in a torque wrench it is clear that various types of wrenches, sockets, screwdrivers or other bits may be used with the tool, there being many standard components available. The tool can also be operated as a manual torque wrench by attaching a suitable handle to the shank 52, the switch being inoperative in such a case, although the guide bars will still be extended when the preset torque is reached to indicate that condition.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A torque wrench, comprising: a barrel portion having means for holding a wrench element; a drive shaft extending axially into said barrel portion; a motor operatively connected to said drive shaft and having a power cut-off means; a driving connection between said drive shaft and said barrel portion; said driving connection being disengageable by axial movement of said drive shaft; spring bias means on said drive shaft to hold said driving connection in engagement; and actuating means being operable by axial movement of said drive shaft in one direction to operate said power cut-off means and stop said motor; a housing mounted on said barrel portion; and axially slidable guide bars fixed to said power cut-off means and having portions extending externally of the housing and immediately adjacent to the first mentioned means to give a visual indication of power cut-off when said power cut-off means is in power shut off position; said guide bars constituting manually operable resetting means to return said power cut-off means to operative position.

2. A torque wrench, comprising: a barrel portion having means for holding a wrench element; a drive shaft extending axially into said barrel portion; a motor operatively connected to said drive shaft and having a power cut-off means; a driving connection between said drive shaft and said barrel portion; said driving connection being disengageable by axial movement of said drive shaft; spring bias means on said drive shaft to hold said driving connection in engagement; and actuating means operable by axial movement of said drive shaft in one direction to operate said power cut-off means and stop said motor; a housing mounted on said barrel portion; said power cut-off means having guide bar portions extending externally of said housing and immediately adjacent to the first mentioned means when the power cut-off means is in power shut off position; said bar portions constituting manually operable resetting means to return said power cut-off means to operative position; and detents in said housing engageable with said bar portions to hold said power cut-off means in either operative or inoperative position.

3. A torque wrench, comprising: a barrel portion having means for holding a wrench element; a drive shaft extending axially into said barrel portion; a motor operatively connected to said drive shaft and having a power cut-off means; a driving connection between said drive shaft and said barrel portion; said driving connection being disengageable by axial movement of said drive shaft; spring bias means on said drive shaft to hold said driving connection in engagement; a switch assembly including a housing mounted on said barrel portion; a pair of opposed terminals fixed in said housing and connected to said motor; said power cut-off means being a switch element mounted in said housing for movement generally parallel to the axis of said drive shaft; said switch element normally engaging and closing a circuit between said terminals; actuating means coupled to said drive shaft to move said switch element by axial movement of the drive shaft, thereby breaking the circuit and stopping said motor; guide bar portions fixed to said switch element and extending externally of said housing when the circuit is broken; and detents in said housing engageable with said guide bar portions to hold said switch element in either open or closed position.

4. A torque wrench, comprising: a barrel portion having means for holding a wrench element; a drive shaft extending axially into said barrel portion; a motor operated by hydraulic fluid and operatively connected to said drive shaft and having a power cut-off means; a driving connection between said drive shaft and said barrel portion; said driving connection being disengageable by axial movement of said drive shaft; spring bias means on said drive shaft to hold said driving connection in engagement; said power cut-off means including a housing mounted on said barrel portion; said housing having an inlet and an outlet for connection in the hydraulic fluid circuit of said motor; a transfer element mounted in said housing and constituting a fluid passage from said inlet to said outlet in an open position; actuating means coupled to said drive shaft to move said transfer element to a closed position by axial movement of the drive shaft and block said inlet and outlet, thereby stopping said motor; and detents in said housing engageable with said transfer element to hold the element in either open or closed position; said transfer element having guide bars fixed thereto and extending externally of said housing; said guide bars constituting manually operable resetting means to shift said transfer element from closed to open position.

References Cited in the file of this patent

UNITED STATES PATENTS

| | | |
|---|---|---|
| 2,292,146 | Meunier | Aug. 4, 1942 |
| 2,422,905 | Jackson | June 24, 1947 |
| 2,565,579 | Thorner | Aug. 28, 1951 |
| 2,639,636 | Peck | May 26, 1953 |
| 2,796,161 | Graybill | June 18, 1957 |
| 2,835,365 | Rice et al. | May 20, 1958 |